Aug. 25, 1964  D. M. R. LESAGE  3,146,293
MEASURING THE MEAN DENSITY OF THE ATMOSPHERE
Filed Feb. 20, 1961  2 Sheets-Sheet 2
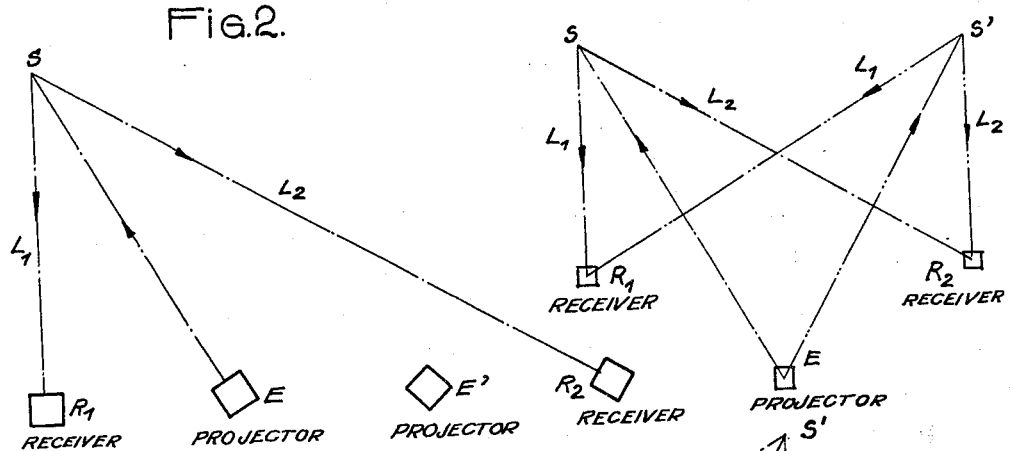
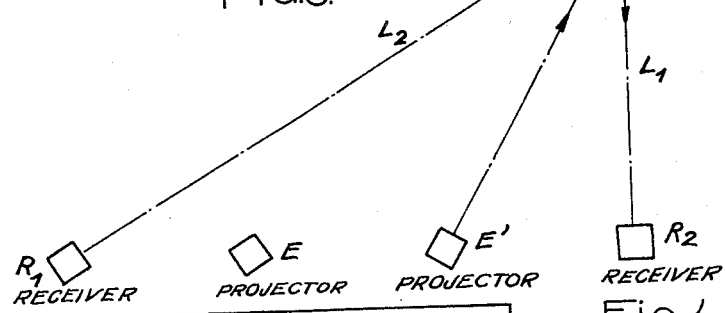
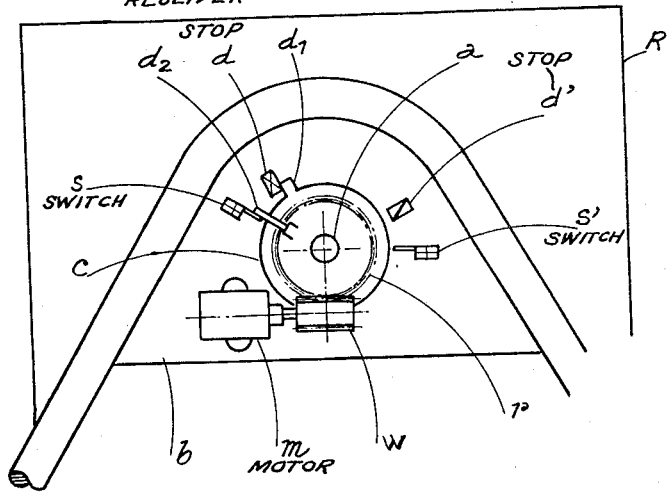
Inventor:
Daniel Marie René Lesage
by: George H. Spencer

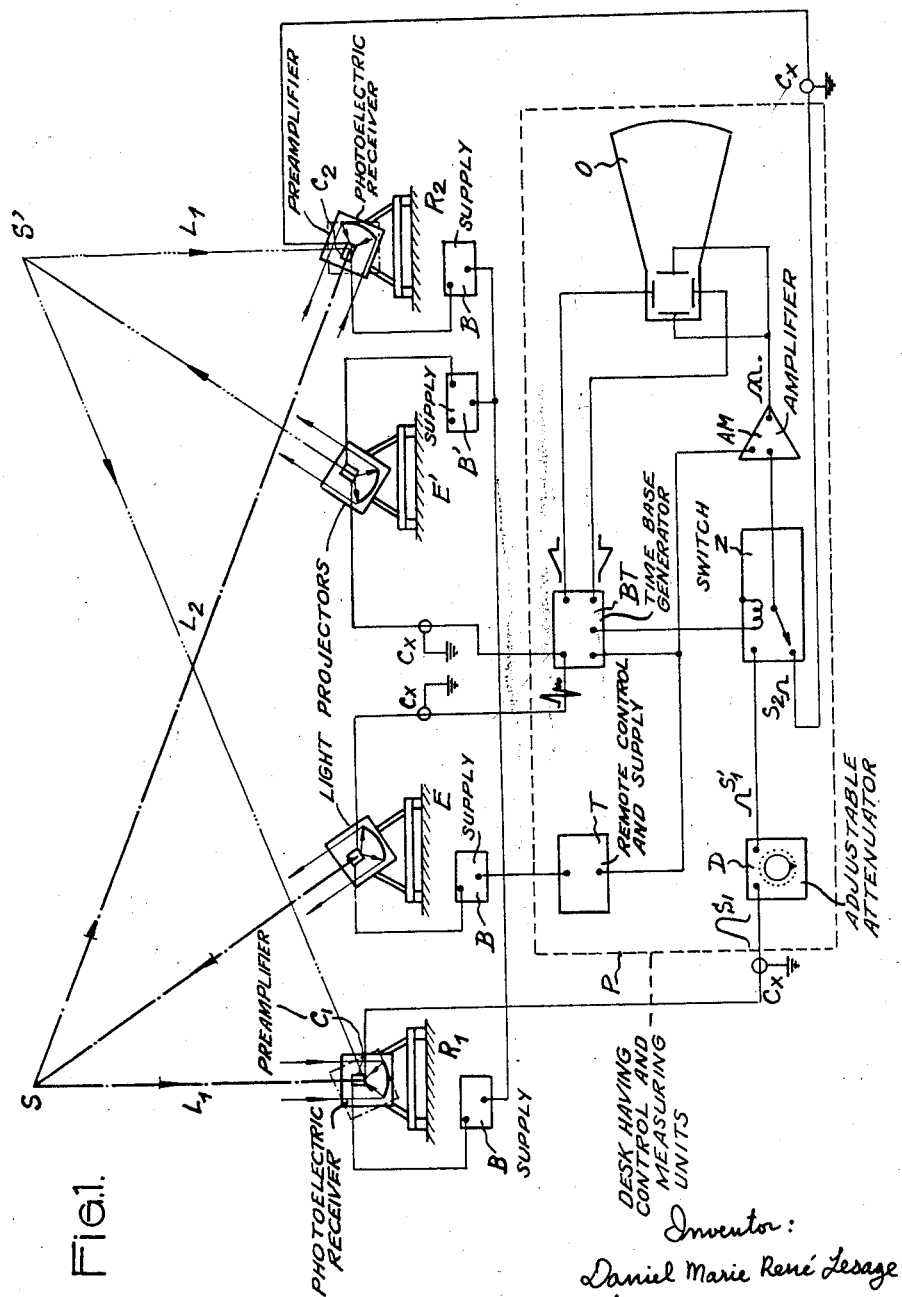

United States Patent Office 3,146,293
Patented Aug. 25, 1964

3,146,293
MEASURING THE MEAN DENSITY OF THE ATMOSPHERE
Daniel Marie René Lesage, Montrouge, Seine, France, assignor to Compagnie des Compteurs, Paris, France, a company of France
Filed Feb. 20, 1961, Ser. No. 90,318
Claims priority, application, France, Feb. 22, 1960, 819,150, Patent 1,257,697
6 Claims. (Cl. 88—14)

The present invention relates to improvements in the method of measuring the light attenuation coefficient, or optical density of the atmosphere, according to a given direction, and a device for putting this method into operation.

It is known that oblique visibility is one of the important indications that must be given to pilots on the point of landing on an airfield. It is necessary, while taking other factors into account, such as the brilliancy of the background, to know the light attenuation coefficient, or optical density of the atmosphere, according to the direction of the pilot's observation to be able to deduce visibility from it.

The invention relates to a method and device for measuring the light coefficient of attenuation or optical density of the atmosphere between the ground and any point in space, according to a direction that can make any angle with the horizontal.

A method is already known for measuring the mean optical density of the atmosphere based on the measuring of the ratio of two luminous fluxes and consisting of emitting a luminous pencil, of observing the light zone eventually diffused surrounding the considered point by means of two photoelectric receivers located to receive the luminous pencil under an equal angle, and of comparing the luminous fluxes received by each of said receivers.

In this method, the result of the measurement is in relation to various parameters and more particularly includes a term which necessitates the use of the coefficient of conversion of the photoelectric receivers, i.e., the factor of proportionality between the luminous flux received by a receiver and the electric output voltage that it supplies. Now, in actual practice, the conversion coefficients of receivers may vary in time under the effect of various causes; measurement being then found to be spoiled by an error introduced by the variations of said coefficients.

The invention has the purpose of improving the accuracy of the measurement by obviating this disadvantage thanks to a method in which the result of the measurement is obtained independently of the conversion coefficients of the photoelectric receivers whose possible variations are then without effect.

The method, according to the invention, consists of carrying out two operations of measurement by the known method, one in the direction and over the distance concerned, by means of two photoelectric receivers observing a light zone of a luminous pencil seen under the same angle, the other in a symmetrical position in relation to the former by means of the same receivers observing a light zone of a second luminous pencil seen under the same angle, the value of the light attenuation coefficient being deduced by the half-sum of the measurements resulting from these two operations.

The invention also has the purpose of providing equipment enabling the method to be put into operation.

The invention will be better understood by referring to the following description and figures, given solely by way of non-restrictive examples.

FIGURE 1 is a diagrammatic view showing measuring equipment according to the invention.

FIGURES 2 and 3 are views diagrammatically showing two characteristic measuring positions in the method according to the invention.

FIGURE 4 is a diagrammatic elevation of a form of embodiment of a control device for one of the receivers comprised by the equipment.

FIGURE 5 is a diagrammatic view similar to FIGURES 2 and 3 showing a variant.

In FIGURE 1, a luminous pulse source or light projector E illuminates the region S. Two photoelectric receivers $R_1$, $R_2$ cover the region S according to two directions equally sloped in relation to the axis of the luminous pencil of the source E. When the atmosphere is foggy, the region S diffuses the same intensity $i$ in the directions of the two receivers $R_1$ and $R_2$. The distances of these two receivers from the zone S being respectively $L_1$ and $L_2$, and the mean decimal light attenuation coefficient of the atmosphere between the ground and the zone S being $\beta$, the receiver $R_1$ receives a luminous flux: $\phi_1 = K_1 \cdot i \cdot 10^{-\beta L_1}$ and the receiver $R_2$ a luminous flux: $\phi_2 = K_2 \cdot i \cdot 10^{-\beta L_2}$ The coefficients $K_1$ and $K_2$ are purely geometrical and only depend on the entry surface of the receivers, on their angle of field, on the distance of the receivers to the zone S and on the angle of the pencils of the receivers with that of the source.

The light attenuation coefficient $\beta$ may be put down as:

$$\beta = \frac{1}{L_1 - L_2} \left( \log \frac{K_1}{K_2} + \log \frac{\phi_2}{\phi_1} \right)$$

$L_1$ and $L_2$ are known.

The ratio $K_1/K_2$ can be determined experimentally as will be shown farther on, or theoretically. There remains to be measured the ratio $\phi_2/\phi_1$ to obtain $\beta$.

The two photoelectric receivers $R_1$ and $R_2$ convert the luminous fluxes that they receive into proportional voltages, with the conversion factors $g_1$ and $g_2$ (in volts/lumen). The output voltages of the two receivers are thus: $V_1 = g_1 \cdot \phi_1$ and $V_2 = g_2 \cdot \phi_2$, hence:

$$\beta = \frac{1}{L_1 - L_2} \left( \log \frac{K_1}{K_2} + \log \frac{V_2}{V_1} + \log \frac{g_1}{g_2} \right)$$

We may make a measurement of the ratio of output voltages of the two receivers in fine weather ($\beta$ appreciably zero), being $$A = \log \frac{V_2}{V_1}$$

In these conditions, we have:

$$0 = \frac{1}{L_1 - L_2} \left( \log \frac{K_1}{K_2} + \log \frac{g_1}{g_2} + A \right)$$

hence $$\log \frac{K_1}{K_2} + \log \frac{g_1}{g_2} = -A \qquad (2)$$

The calibration magnitude A having been measured, it is possible to make mean attenuation measurements according to the relation:

$$\beta = \frac{1}{L_1 - L_2} \left( \log \frac{V_2}{V_1} - A \right) \qquad (1)$$

where all the elements are known.

FIGURE 1 shows a form of embodiment of a device for operating this method utilizing a pulsed light source or projector. The luminous pulse projector E and the two photoelectric receivers $R_1$, $R_2$ are respectively connected to their power supply devices B and linked up, on the other hand, to the remote control and supply device T placed in desk P comprising the control and measuring units of the equipment. The receivers $R_1$ and $R_2$ respectively comprise a photoelectric cell-preamplifier unit $C_1$ and $C_2$ at the focus of a parabolic mirror, connected to the measuring desk P by two coaxial cables $Cx$ which end at a switch Z, the first through an adjustable attenuator D, the second, directly.

The switch Z has been shown in an electro-mechanical form, but can also be of the electronic type. It successively puts into connection the receiver $R_1$ and the receiver $R_2$ with the amplifier AM. This switch is controlled by a time base BT at a frequency half that of the recurrency frequency of the luminous pulses transmitted by the source E. The signal $S_1$ applied to the attenuator D gives a signal $S'_1$ which is alternately applied with the signal $S_2$ to the input of the amplifier AM.

The output voltage of the amplifier AM is applied on the vertical deviation plates of the oscillograph tube O. The horizontal scanning plates are connected to the time base BT which is in connection with the source E by a coaxial cable $Cx$ by means of which said time base receives a synchronization signal having the effect of triggering the horizontal scanning in synchronism with the emission of the luminous spark.

The two electric signals produced by the input of the luminous flux coming from the zone S on to the receivers $R_1$ and $R_2$ appear separately on the screen of the oscillograph O owing to the differences between the courses $L_1$ and $L_2$ covered by the luminous signals, and the delays applied by the cables $Cx$ carrying the corresponding electric signals $S_1$ and $S_2$ obtained in the receivers $R_1$ and $R_2$.

By means of the attenuator D, we reduce, as already explained above, the amplitude of the signal $S_1$ so as to make it equal to that of the signal $S_2$. By designating $v$ the logarithmic light attenuation coefficient when the equality of the attenuated signal $S'_1$ and the signal $S_2$ are made, the ratio of the output voltages $V_1$, $V_2$ of the two receivers is then:

$$\log \frac{V_2}{V_1} = v$$

from which we deduce the mean light attenuation by the relation 1.

This presumes that the gain and the sensitivity of the receivers $R_1$ and $R_2$ are constant. Now, we have previously stated that if, in the expression 2, $K_1$ and $K_2$ are constants, invariable in time, the conversion factors $g_1$ and $g_2$ of the two receivers can be provided owing to the fact of variations in sensitivity of the photosensitive detectors, changes of state of the surface of mirrors, etc.

It is thus particularly important to be able to eliminate the effects of the variations of the conversion coefficients of the two receivers. It is possible to effect a measurement of the mean light attenuation coefficient, independently of these conversion coefficients, in accordance with the method of the invention, according to which two measuring operations are successively made, such as those that have just been explained, in two symmetrical positions utilizing the same receivers. To this end, the equipment, shown in FIGURE 1 and diagrammatically in FIGURES 2 and 3 in each of the symmetrical positions, comprises two sources E and E' with continuous or modulated light and the two receivers $R_1$, $R_2$, as well as the desk P previously described to whose time base BT the second source E' is connected in the same way as the source E.

Each of the two receivers $R_1$ and $R_2$ can occupy two positions, whereas the sources are fixed, the passage from one to the other being remote controlled from the measuring desk by any suitable means such as that described hereafter with reference to FIGURE 4.

In a first measuring position, FIGURE 2, only the source E operates and the optical axis of the receiver $R_1$ is vertical and the optical axis of the receiver $R_2$ is oblique. The vertical direction is selected for ease, but is not of course compulsory, and could itself be oblique. These two axes converge at the point S at an altitude $L_1$ and at a distance $L_2$ from the receiver $R_2$.

The source E is so placed that its optical axis coincides with the bisectrix of the angle formed by the optical axes of the two receivers. This source E being put into service, the ratio of the output voltages of the two receivers is measured as before:

$$v = \log \frac{V_2}{V_1}$$

In these conditions, we have:

$$\beta = \frac{1}{L_1 - L_2} \left( \log \frac{K_1}{K_2} + \log \frac{V_2}{V_1} + \log \frac{g_1}{g_2} \right)$$

In the second measuring position, FIGURES 1 and 3, the optical axis of the receiver $R_2$ is vertical, that of the receiver $R_1$ oblique. These two axes converge at the point S' of the same altitude $L_1$ as the point S, at the distance $L_2$ from the receiver $R_1$. The source E' is so placed that its optical axis coincides with the bisectrix of the angle formed by the optical axes of the two receivers in their new position. We see that these two measuring positions are symmetrical the one to the other, in relation to the median plane of the segment $R_1$, $R_2$. By then putting the source E' into operation, we measure the ratio of the output voltages of the two receivers:

$$v' = \log \frac{V'_1}{V'_2}$$

Because of the symmetry of the equipment, the coupling coefficient of the receiver $R_2$ to the pencil of the source E' in the second measuring position is equal to the coupling coefficient of the receiver $R_1$ to the pencil of the source E in the first measuring position. Likewise, the coupling coefficient of the receiver $R_1$ to the pencil of the source E' in the second measuring position is equal to the coupling coefficient of the receiver $R_2$ to the pencil of the source E in the first measuring position. We thus have:

$$\beta = \frac{1}{L_1 - L_2} \left( \log \frac{K_1}{K_2} + \log \frac{V'_1}{V'_2} + \log \frac{g_2}{g_1} \right)$$

If atmospheric conditions have not altered between the two measurements, that is to say if $\beta$ has not varied, which can be accepted owing to their rapidity, we can put down:

$$\beta = \frac{1}{L_1 - L_2} \left( \log \frac{K_1}{K_2} + \log \frac{V_2}{V_1} + \log \frac{g_1}{g_2} \right)$$

$$= \frac{1}{L_1 - L_2} \left( \log \frac{K_1}{K_2} + \log \frac{V'_1}{V'_2} + \log \frac{g_2}{g_1} \right)$$

hence, in making the half-sum:

$$\beta = \frac{1}{2} \cdot \frac{1}{L_1 - L_2} \left( 2 \log \frac{K_1}{K_2} + \log \frac{V_2}{V_1} + \log \frac{V'_1}{V'_2} \right)$$

We thus obtain the expression of $\beta$ independently of the conversion factors $g_1$ and $g_2$ of the two receivers. The value of $$\frac{K_1}{K_2}$$

is preferably measured in fine weather, when $\beta$ is sufficiently low to be considered equal to zero. In these conditions, a series of measurements are made as formerly, and we obtain:

$$0 = \frac{1}{2} \cdot \frac{1}{L_1 - L_2} \left[ 2 \log \frac{K_1}{K_2} + \log \frac{(V_2)_0}{(V_1)_0} + \log \frac{(V'_1)_0}{(V'_2)_0} \right]$$

hence:

$$2 \log \frac{K_1}{K_2} = - \left[ \log \frac{(V_2)_0}{(V_1)_0} + \log \frac{(V'_1)_0}{(V'_2)_0} \right] = C = \text{constant}$$

and in carrying forward in the expression of $\beta$:

$$\beta = \frac{1}{2} \cdot \frac{1}{L_1 - L_2} \left( C + \log \frac{V_2}{V_1} + \log \frac{V'_1}{V'_2} \right)$$

where there no longer appear anything but the ratios of the output voltages of the two receivers for the two measuring operations.

The equipment enabling this measurement method to be put into operation of the attenuation light coefficient β not differing from that described at the beginning of this description except for the addition of the second fixed projection E' and a remote control device for shifting the receivers $R_1$ and $R_2$ from one measuring position to the other, it is not necessary to describe it again in detail, and we shall confine ourselves to stating how this shifting from one position to the other on a receiver is effected. By way of example, a control device of this kind is described in FIGURE 4. The movable part R of the receiver can pivot around the axis of a horizontal shaft $a$. This shaft $a$ is driven by the remote control motor $m$ placed on the fixed frame $b$ of the apparatus by means of a tangent screw $w$ and a cogwheel $r$ keyed on to this shaft. The link between the movable receiver R and the shaft $a$ is not rigid, but comprises an elastic coupling $c$ enabling a slight relative slipping between these two elements. When the shaft $a$ revolves, a finger $d_1$ integral with the movable receiver R limits the rotation of the latter to an angular displacement defined by means of two stops $d$ and $d'$ placed on the fixed frame $b$. These two stops correspond to two measuring positions, vertical and oblique, that the movable receiver R must assume. On the other hand, a second finger $d_2$ carried by the shaft $a$ can act on two switches $s$ and $s'$ fixed on the frame $b$ when it reaches their contact. These switches, whose angular deviation is purposely greater than the angular deviation between the stops $d$ and $d'$, cause the motor $m$ to stop when they are actuated by the finger $d_2$.

The device works as follows:

To pass from one measuring position to the other, the motor $m$ is started up by remote control transmitted from the measuring desk. By means of the elements $w$, $r$ and $c$, the rotation of the motor causes the rotation of the movable part R of the receiver. The finger $d_1$ comes into contact with one of the stops $d$ or $d'$ and the movable receiver R retains this position, whereas the elastic coupling $c$ still allows the shaft $a$ to rotate until the finger $d_2$ actuates the switch $s$ or $s'$ which then stops the motor. The connection between the tangent screw $w$ and the cogwheel $r$ being irreversible, the movable receiver R is kept in contact with the stop in the correct measuring position, thanks to the torsion of the elastic coupling $c$.

FIGURE 5 shows an alternative of the equipment of FIGURES 1 to 3 according to which it becomes possible in a particular case, to use only one source E, while obtaining the same advantages as described above. According to the alternative, the source E still formed by a projector is mounted on a pivoting support enabling it to be turned in two given directions for which the pencils that it transmits alternately to the point S and to the point S' are directed according to the bisectrix of angles formed by $L_1$ and $L_2$ from the points S or S'. An equipment of this kind requires the receivers $R_1$ and $R_2$ to be placed at exactly fixed spots in consideration of the altitude of the points S and S', but obviously enables investment expenditure to be reduced as there is only one source used.

Although the invention has been described in relation to particular form of embodiment, it is obvious that numerous modifications can be applied to it without going outside of its scope.

I claim:

1. Equipment for use in determining the mean optical density of the atmosphere, comprising, in combination:
   (a) two movable photosensitive receivers for converting light into electrical signals;
   (b) means connected to said receivers for selectively turning each of them into two distinct angular observation positions so that both will receive light from the same place;
   (c) at least one projector means for providing a luminous pencil and directed to form the bisectrix of the successive observation angles of said receivers;
   (d) means for controlling said projector means and including
      (1) a time base mechanism for timing purposes,
      (2) a power supply, and
      (3) a device for remotely controlling said projector means;
   (e) an electric signal amplifier;
   (f) a switch controlled by said time base mechanism and connected with said receivers for successively connecting the two receivers with said signal amplifier; and
   (g) an electric signal measuring apparatus connected with said signal amplifier.

2. Equipment as defined in claim 1 comprising at least one attenuating means interposed between one of said receivers and said switch for equalizing the signal magnitudes of said receivers.

3. Equipment for use in determining the mean optical density of the atmosphere, comprising, in combination:
   (a) two photoelectric receivers, each including a photoelectric cell-preamplifier unit mounted at the focus of a parabolic mirror;
   (b) two fixed means for projecting pulsed luminous signals in the form of pencils;
   (c) means connected to said receivers for turning them in two distinct directions in each of which the angles formed by their respective optical axes with the direction of a different one of said pencils are equal;
   (d) a time base mechanism for timing purposes and connected to said projecting means for initiating the pulsed luminous signals;
   (e) means for remotely controlling, supplying and governing said projecting means;
   (f) a signal amplifier;
   (g) a switch electrically connected with said receivers for successively connecting the two receivers with said amplifier; and
   (h) a measuring apparatus connected with said signal amplifier.

4. Equipment for use in determining the mean optical density of the atmosphere, comprising, in combination:
   (a) two photoelectric receivers, each including a photoelectric cell-preamplifier unit mounted at the focus of a parabolic mirror;
   (b) means for projecting a pulsed luminous signal in the form of a pencil;
   (c) means connected to said receivers and said projecting means for turning each of them in two distinct directions in each of which the angles formed by the respective optical axes of said receivers with the direction of the pencil are equal;
   (d) a time base mechanism for timing purposes and connected to said projecting means for initiating the pulsed luminous signal;
   (e) means for remotely controlling, supplying and governing said projecting means;
   (f) a signal amplifier;
   (g) a switch electrically connected with said receivers for successively connecting the two receivers with said amplifier; and
   (h) a measuring apparatus connected with said signal amplifier.

5. Equipment for use in determining the mean optical density of the atmosphere, comprising, in combination:
   (a) two photosensitive receivers, each including
      (1) a fixed frame,
      (2) a movable member,
      (3) horizontal shaft means supported by said frame and around which said movable member moves,
      (4) an elastic coupling connecting said movable member to said shaft means,
      (5) motor means carried by said frame and including an irreversible transmission driving said shaft means,
      (6) two stops on said frame arranged for securing said movable member in two distinct positions for which the receiver occupies two distinct angular observation positions and the positions for the two receivers permitting the two receivers to face toward the same place, and (7) two switches arranged to be actuated by the shaft means for causing stopping of said motor means when said movable member is stopped by one of said stops;

(b) at least one means providing a source of a pencil of rays and directed to form the bisectrix of the successive angles of the observation positions of said receivers;

(c) means for controlling the equipment and including
(1) a time base mechanism for timing purposes,
(2) power supply means, and
(3) a device for remotely controlling said projector means;

(d) a signal amplifier;

(e) a switch controlled by said time base mechanism and connected with said receivers for successively connecting the two receivers with said signal amplifier; and (f) a measuring apparatus connected with said signal amplifier.

6. In a method of determining the mean optical density of the atmosphere, the improvement, comprising the steps of:

(A) projecting a first luminous pencil toward a first distinct point in the atmosphere from a projecting point located on a substantially straight line;

(B) projecting a second luminous pencil from a projecting point located on said substantially straight line toward a second distinct point in the atmosphere which is in a single plane with all of said aforementioned points and said line;

(C) successively
(1) detecting light from said first distinct point simultaneously
(a) at a first detection point on said line spaced a first distance from said first distinct point and a second and different distance from said second distinct point and at a first angle with said line, and
(b) at a second detection point on said line spaced said first distance from said second distinct point and said second distance from said first distinct point and at a second and different angle with said line, and
(2) detecting light from said second distinct point at said first and second detection points at said second and first angles, respectively, with said line;

(D) converting the detected light into electrical signals significant of the intensity of said light; and (E) measuring said electric signals.

References Cited in the file of this patent

UNITED STATES PATENTS

| | | |
|---|---|---|
| 1,864,442 | Kinsey | June 21, 1932 |
| 2,018,134 | Buckley | May 25, 1937 |
| 2,481,034 | Neufeld | Sept. 6, 1949 |
| 2,907,889 | Nichols et al. | Oct. 6, 1959 |

FOREIGN PATENTS

| | | |
|---|---|---|
| 794,472 | Great Britain | May 7, 1958 |